June 1, 1943.  E. H. VEDDER ET AL  2,320,491
DISCHARGE APPARATUS
Filed June 16, 1938   5 Sheets-Sheet 1

WITNESSES:
E. A. McCloskey.
Hymen Diamond

INVENTORS
Edwin H. Vedder and
Russell W. Staggs.
BY
F. W. Lyle
ATTORNEY

June 1, 1943.    E. H. VEDDER ET AL    2,320,491
DISCHARGE APPARATUS
Filed June 16, 1938    5 Sheets-Sheet 3

A

B

C

D

WITNESSES:
E.A. M?Closkey
Hymen Diamond

INVENTORS
Edwin H. Vedder and
Russell W. Staggs.
BY
F. W. Lyle.
ATTORNEY

June 1, 1943.  E. H. VEDDER ET AL  2,320,491
DISCHARGE APPARATUS
Filed June 16, 1938  5 Sheets-Sheet 4
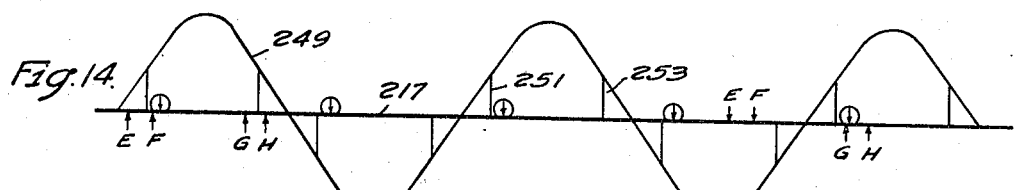
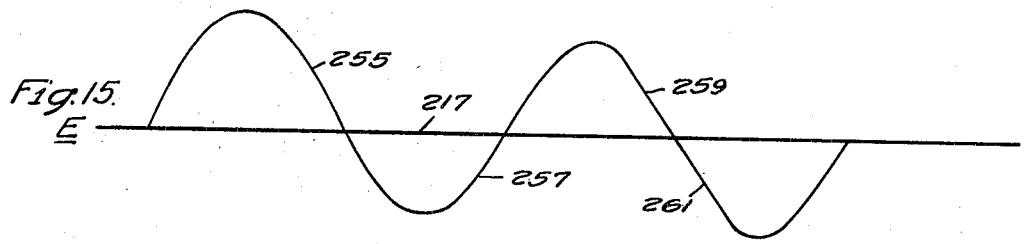
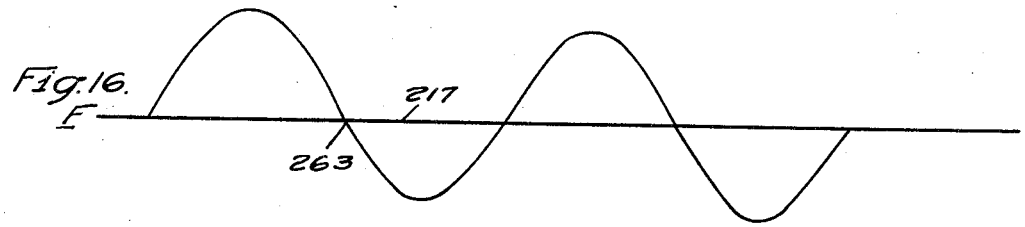
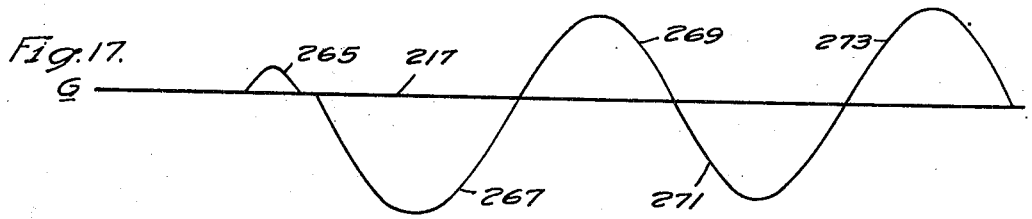
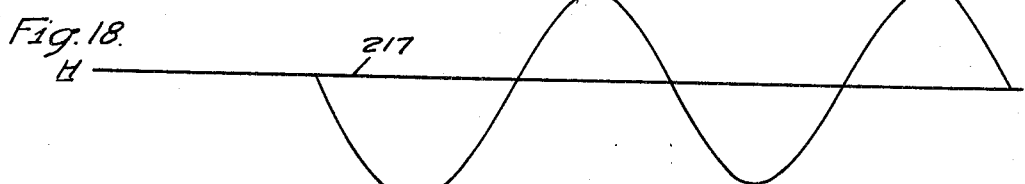
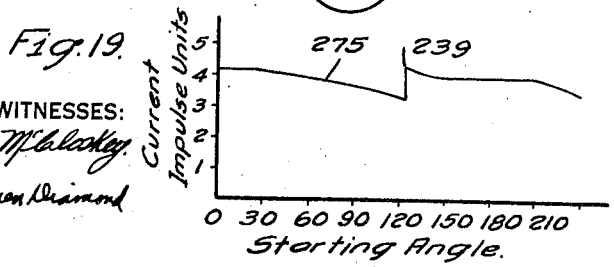
INVENTORS
Edwin H. Vedder and
Russell W. Staggs.
BY
ATTORNEY

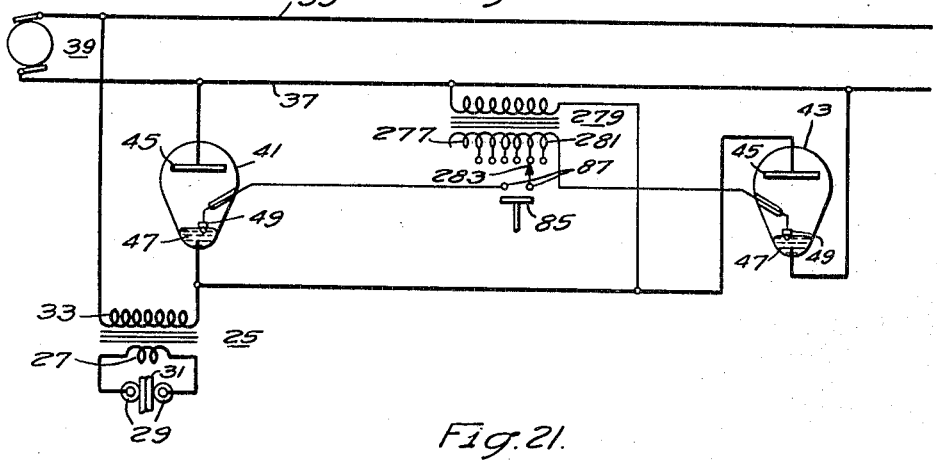
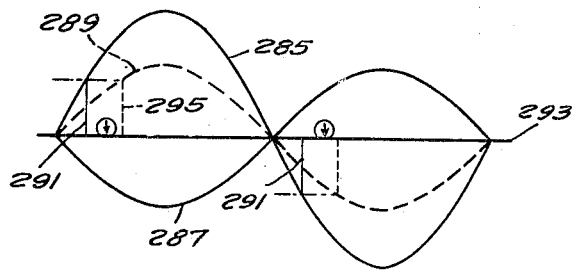
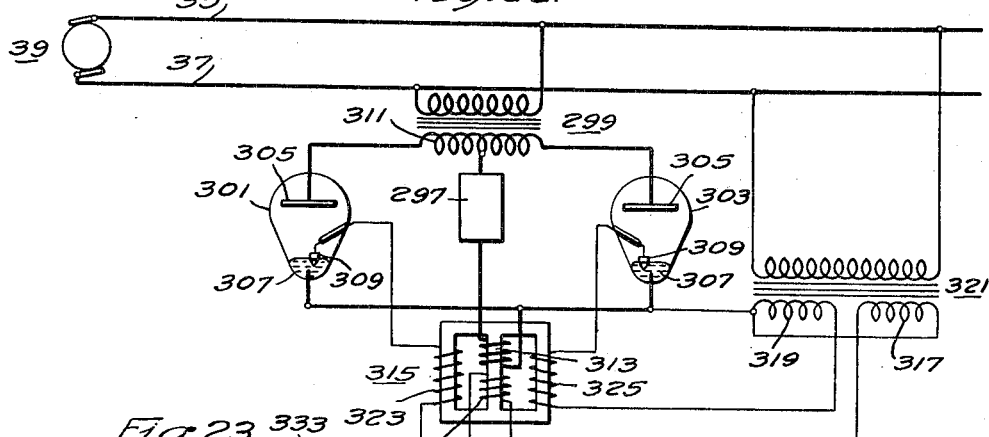
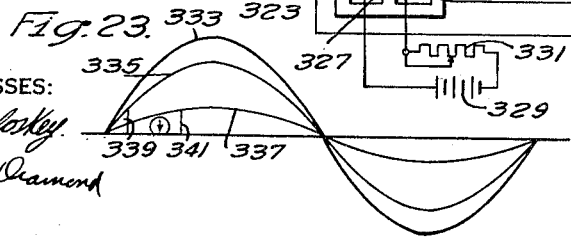

Patented June 1, 1943

2,320,491

UNITED STATES PATENT OFFICE 2,320,491

DISCHARGE APPARATUS

Edwin H. Vedder, Forest Hills, Pa., and Russell W. Staggs, Detroit, Mich., assignors to Westinghouse Electric & Manufacturing Company, East Pittsburgh, Pa., a corporation of Pennsylvania Application June 16, 1938, Serial No. 214,160

16 Claims. (Cl. 250—27)

Our invention relates to electric discharge apparatus and has particular relation to welding apparatus incorporating electric discharge valves.

In resistance, spot and seam welding apparatus the welding current is supplied in the form of intermittent impulses. Each impulse is supplied for a predetermined interval of time and two successive impulses are separated by a predetermined interval of time which we may designate as a pause interval. The impulses, moreover, are supplied from an alternating current source and are made up of trains of sub-impulses, each of the latter corresponding to a half period of the source. In welding of this type, it is often important that there shall be no material variation in the impulses, both as regards the relationship of the instantaneous magnitude of any sub-impulse to the magnitude of the others and as regards the product of the time of flow of the impulses and the average magnitude of the current in any one impulse, i. e., the ampere seconds. If the difference between the maximum and minimum current time product is, for example, as much as 50%, difficulty is involved in setting the mean current at a value such that satisfactory results are obtained in the welding of many materials. A number of the welds are weak because the current time is too small to properly fuse the material to be welded and for many welds the current time is so large that the material is burned. Accordingly, an essential problem in the design and construction of resistance welding apparatus is to provide for such timing of the welding current impulses that there is no substantial deviation from weld to weld. The problem thus reduces itself to one involving the provision of suitable timing apparatus. Moreover, large differences between the amplitudes of the individual sub-impulses such as are produced by transients, for example, result in a sudden rush of current of one polarity or the other through the material to be welded and in the production of entirely unsatisfactory welds. Accordingly, another essential problem in resistance welding is to provide for the supply of welding impulses, the sub-impulses of which shall not vary materially from a predetermined normal. The latter problem generally resolves itself into one involving the suppression of large transients.

In accordance with the teachings of the prior art of which we are aware, the welding current impulses are supplied from an alternating-current source and the timing takes place either asynchronously or synchronously, depending on the character of the work desired. Where the material to be welded is relatively heavy and the welds may be relatively crude and not altogether uniform, asynchronous timing is used. In this case irregular pulses of current are transmitted through the material to be welded and in general, the variation in the welding current is not limited to any reasonable extent. Where high uniformity is desired in the welds, as for example, in the airplane industry and, in general, where relatively thin metal such as aluminum sheet or stainless steel is to be welded, synchronized timing has been adopted art.

The synchronous timers which have been provided in accordance with the teachings of the prior art are highly elaborate and expensive. In the most common cases they comprise six to nine electric discharge valves, and with the valves a number of synchronizing and controlling elements are associated. In addition there is adjusting means for the synchronizing equipment which provides for the initiation of the welding impulses at selected points in the half-periods of the source so that transients are avoided.

We have found that between the welding problems which may be solved with relatively crude timers and those which require highly refined timing, there is in the welding industry a vast intermediate field as far as the timing demands are concerned. While the welding in this field requires a certain degree of uniformity in welding current, which is not attainable with crude welders, the extreme accuracy of the highly synchronized equipment of the prior art apparatus is not indispensable. With many materials, for example, the welding is satisfactory if the maximum variation in the welding current time from weld to weld is not greater than 25%; in a number of other situations the welding current may vary as much as 40 to 50%; while in still others, the range of variation must be limited to from 5 to 10%. Moreover, there may be some variation in the magnitude of the sub-impulses although it must be maintained within limits. The asynchronous welders of the prior art cannot be used in this field because the variation of the welding current from spot to spot cannot be maintained within the required limits and there is a large variation in the magnitude of the sub-impulses. Highly refined synchronous timers perform satisfactorily but their cost is excessive.

From the foregoing comments it is seen that an asynchronous welder which incorporates some means for limiting the maximum deviation of the welding current time and the fluctuations occurring in the impulses from weld to weld is a desideratum. In an asynchronously controlled welder, the deviation arises from two principal causes. First, the asynchronous timing involves the starting and stopping of the current at random instants in the half-periods of the supply source to produce the impulses. Because of this random effect, certain of the impulses may be made up of more half-cycles of current from the source than others, i. e., the current time product for the different welding impulses may vary. Second, the power factor of the welding load is relatively poor and causes difficulties. Since the starting of the welding impulse is in an asynchronous arrangement at random, the initiation of an impulse often leads the steady-state current zero point by an angle of the order of 90°. The early initiation of the welding impulses introduces a transient effect which not only materially varies the current time product but gives rise to sub-impulses having amplitudes substantially twice the amplitude of the steady state sub-impulses. The largest sub-impulses produced by transients are the first ones in the trains which make up the impulses and, therefore, when they occur there is a sudden rush of current of large magnitude, following a pause interval which is no way conducive to the production of a good weld.

It is, accordingly, an object of our invention to provide a resistance welding system wherein the range of variation in the current flow, both as regards instantaneous magnitude and as regards the current time product for the successive welding impulses shall not be greater than a predetermined magnitude.

Another object of our invention is to provide an asynchronously timed welding system that shall be particularly adapted for welding materials wherein satisfactory welds are produced even if the welding current from weld to weld fluctuates within a predetermined limited range.

A further object of our invention is to provide a resistance welding system incorporating a timer that is set to operate at random wherein large fluctuations in the instantaneous magnitude of the current such as is produced by transients shall be maintained within well defined limits.

A general object of our invention is to provide a control system for supplying current to a load in intermittent impulses that do not deviate in magnitude, both as regards instantaneous values and the current time product from each other by more than a predetermined value.

Another general object of our invention is to provide a contrivance for so timing the supply of current from a source to a load that the load shall be supplied with intermittent current impulses that do not deviate from each other in magnitude by more than a predetermined value.

A further general object of our invention is to provide an asynchronous contrivance for so timing each of a series of current impulses, supplied from a source to a load, that the difference in the current-time products of any two impulses and the difference in the maxima peaks of any two impulses shall be maintained at a minimum.

An additional general object of our invention is to provide a novel method of controlling the output of an electric discharge valve of the immersed-ignition-electrode type.

A specific object of our invention is to provide a resistance spot and seam welding system that shall operate substantially as a synchronous welder, but shall not incorporate the auxiliary discharge devices and the synchronizing equipment essential in the present synchronous welders.

Another specific object of our invention is to provide a resistance spot and seam welding system that shall be asynchronously timed but shall nevertheless operate synchronously for all practical purposes.

A further specific object of our invention is to provide a regulating device of simple structure for a rectifier system.

A further specific object of our invention is to provide apparatus for supplying power from a periodic source to a load of the type that has a relatively poor power factor in intermittent pulses, each of which persists for a time interval of substantially the same length as the time required for a transient through the said load to decay, by the operation of which the amplitude of the transient waves in the pulses shall be limited to a predetermined value.

More concisely stated, it is an object of our invention to provide an inexpensive and tractable welding arrangement that shall be capable of supplying welding current impulses with the uniformity required in the treatment of materials that allow a limited tolerance in the variation of the welding current.

According to our invention, the welding current is supplied from a periodic source, preferably an alternating-current source, through electric discharge valves of the immersed ignition electrode type. To time the welding current impulses the ignition electrodes of the valves are connected to a supply source for an interval of time corresponding to the desired length of the welding pulses by a simple asynchronous timer of any general type. A synchronously driven timer may, of course, also be used if it is desired.

An electric discharge valve of the immersed-ignition-electrode type comprises an anode of a material such as carbon or nickel, a cathode commonly composed of mercury, and an ignition electrode preferably composed of boron carbide or silicon carbide, which dips into the mercury. We have found that to ignite the valve a potential of substantial magnitude, which shall be designated herein as the ignition potential, must be impressed across the portion of the ignition electrode extending above the mercury. In accordance with the practice of our invention, the ignition potentials supplied through the timing device are of such character that they rise to the value necessary for ignition purposes for the first time in each half-cycle of the source, at a point lagging the point of zero potential by a substantial angle which we shall designate herein as the ignition angle. Accordingly, in spite of the fact that the timing device closes the ignition circuit at random and may close it at any point in the half cycles, the ignition can only take place within a limited angle, equal to 180° minus twice the ignition angle (for a sinusoidal source), in each half cycle of the source. Hence, the variation in the magnitude of the current which may arise by reason of the random closing of the ignition circuit is greatly limited. The possible deviation may be still further decreased by properly relating the time interval during which the ignition circuit remains closed to the time in half-periods of the source during which the welding current is to flow.

The ignition electrodes of the electric discharge valves or the resistance of the ignition circuits, are, moreover, in accordance with a further aspect of our invention, selected to have such properties that the ignition angle is within a limited number of degrees the same as the power factor angle, i. e., the angle between the point of zero potential and the point of steady-state zero current. By reason of this relationship, the possible transient effect which may arise is substantially reduced. For example, we have found that good results are obtained with a source rated at 440 volts R. M. S. and electric discharge valves having ignition electrodes requiring a potential of the order of 100 volts for ignition. In an arrangement tested by us, the valves were connected in anti-parallel between the source and the load and the ignition electrodes were connected in series with each and thus were connected to the source through the mercury electrodes and the load. The steady-state current for a number of welds produced with the system was found by measurement to be 325 amperes R. M. S. or 460 amperes. An oscilloscope showed the maximum peak current to be of the order of 530 amperes. For the same operation carried out with a prior art asynchronous welder, the maximum current peak was found to be 880 amperes. It is seen that by using a system according to our invention, the deviation is reduced from slightly less than 100% to approximately 15%. Attention is called to the fact that in carrying out this test, the 100 volt ignition electrodes were used with a 440 R. M. S. volt source. In such an arrangement, the angle in the half-cycle at which the valves are ignited is $$\sin^{-1}\frac{200}{626}=18.7°$$

If a 220 R. M. S. volt source were used, the angle of ignition would be raised to $$\sin^{-1}\frac{200}{300}=40°$$

and a substantial improvement over the above-mentioned test results would be attained.

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

Fig. 4 is a diagrammatic view showing the transient produced by initiating current flow in the load on which Fig. 3 is based early in a half-cycle;

Figs. 14, 15, 16, 17 and 18 are a set of graphs showing the variation in the current flow for another two-cycle pulse produced with the apparatus constructed according to Figs. 1 or 2;

Fig. 19 is a graph showing the variation in the current flow as a function of the angle of closure of the ignition circuit for the system on which Figs. 14 to 18 are based;

Fig. 20 is a diagrammatic view showing a modification of our invention;

Fig. 21 is a graph illustrating the operation of Fig. 20;

Fig. 22 is a diagrammatic view showing a regulator constructed in accordance with our invention and illustrating the broader aspects of our invention; and Fig. 23 is a graph illustrating the operation of Fig. 22.

Figure 1:
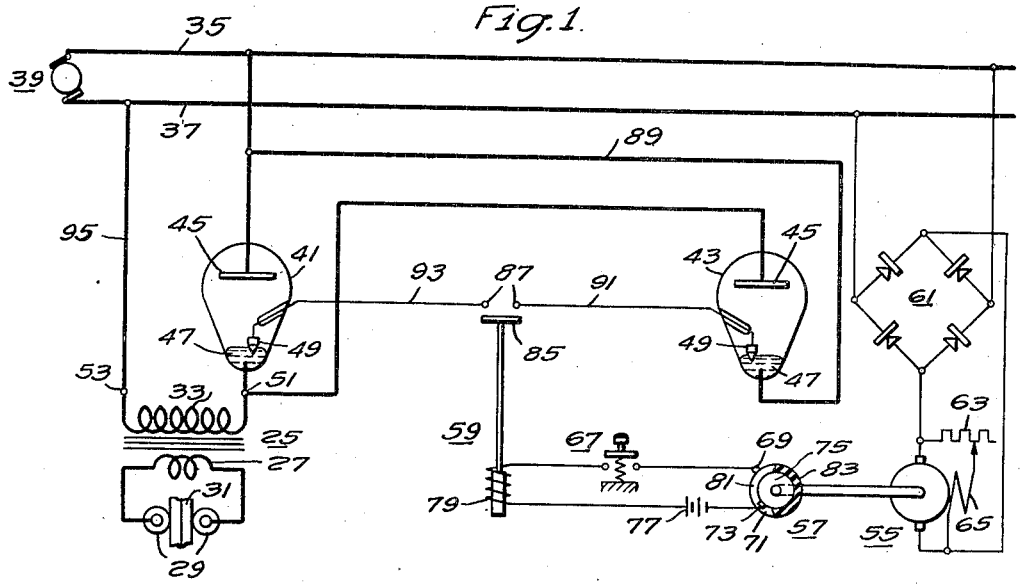
Figure 1 is a diagrammatic view showing a seam welding system in accordance with our invention.

The apparatus shown in Figure 1 comprises a welding transformer 25 to the secondary 27 of which a pair of welding electrodes 29 are connected. The material 31 to be welded is supplied continuously between the electrodes 29 and is welded by the transmission of a series of current impulses between the electrodes and through the material. To facilitate the movement of the material the electrodes may be in the form of rollers.

The primary 33 of the welding transformer 25 is connected across the line conductors 35 and 37 of a suitable alternating-current source 39, which may be of the usual commercial type, through a pair of electric discharge valves 41 and 43. The valves are connected in anti-parallel so that they transmit alternating current through the primary of the transformer.

Each valve preferably comprises an anode 45 of carbon or a suitable metal, a mercury pool cathode 47 and an ignition electrode 49 of boron carbide, silicon carbide, or other suitable high resistance material. The anode of one valve 41 and the cathode of the other are connected to one line conductor 35, while the anode of the latter valve 43 and the cathode of the former are connected to one terminal 51 of the primary 33 of the welding transformer 25. The other terminal 53 of the primary is connected to the other line conductor 37.

The material 31 is welded by transmitting therethrough impulses, each of which is of a length equal to a predetermined number of half-periods of the source 39 and consists of a train of the same number of sub-impulses. The impulses are measured out by the operation of a timer comprising a direct-current motor 55, which rotates a commutator 57, and a timing relay 59 operated in accordance with the movement of the commutator. The motor 55 is supplied from the source 39 through a suitable rectifier 61. Its speed is adjusted by the resistor 63 connected in series with its field winding 65. When power is supplied to the line conductors, the motor rotates at a speed determined by the setting of the resistor 63 and the commutator 57 is, therefore, correspondingly rotated.

To start a seam welding operation after line conductors 35 and 37 have been energized, a starting circuit closer 67 is operated. The latter may be in the form of a push button or a foot switch actuated by the operator, or it may be automatically actuated in response to the arrival of the material within a predetermined region, for example. The circuit closer, when operated, connects a brush 69 engaging the outer ring 71 of the commutator 57 with a brush 73 engaging the inner ring 75 of the commutator through a suitable power source 77 and the exciting coil 79 of the timing relay 59. The outer and inner commutator rings 71 and 75, respectively, are in metallic engagement with each other. The inner ring 75 is completely conductive, while the outer ring 71 is divided into a conductive segment 81 and an insulating segment 83. Accordingly, when the brush 69 engaging the outer ring 71 is in contact with the conducting segment 81, and the starting relay circuit is otherwise closed by the switch 67, the starting relay 59 is energized. When the brush 69 contacts the insulating segment 83, the starting relay 59 is deenergized, even if the switch 67 is closed. To produce a seam weld, the switch 67 is closed for an interval of time corresponding to the length of the seam, and the starting relay 59 is alternately energized and deenergized during this interval. The speed of the motor 55 is customarily so selected that the intervals during which the relay is energized and deenergized include several half-periods of the source, although on rare occasions a single half-cycle speed may be used.

The relay 59 is provided with a movable contactor 85 which engages a pair of corresponding fixed contacts 87 to directly connect the ignition electrodes 49 of the two valves 41 and 43 when the relay is energized. When the ignition electrodes 49 are first connected, the paths between the anodes 45 and the cathodes 47 of the valves 41 and 43 are non-conductive and current flows through the ignition electrodes in one direction or the other depending on the polarity of the source 39 at the time. For example, if the upper line conductor 35 is positive, and the lower one 37 negative, the current flow is in a circuit extending from the upper line conductor through a conductor 89, the cathode 47 and the ignition electrode 49 of the right-hand valve 43, a conductor 91, the contactor 85 of the timing relay 59, a conductor 93, the ignition electrode 49 and the cathode 47 of the left-hand valve 41, the primary 33 of the welding transformer 25, a conductor 95, to the lower line conductor 37. The reverse circuit may be traced in a similar manner when the lower line conductor is positive and the upper line conductor is negative.

Consideration of the above-discussed circuits reveals that the direction of the current flow is from the ignition electrode 49 to the cathode 47 in the valve 41 or 43 for which the potential of the anode 45 is positive relative to the cathode; for example, in the valve 41 under the conditions assumed in tracing the circuit. When the potential across the ignition electrode 49 in the valve 41 or 43 for which the anode-cathode potential is positive, and the ignition current flow is from the ignition electrode, rises to a sufficient value to render the valve conductive, current flows in the valve between the anode and the cathode and through the primary 33 of the welding transformer 25. The same situation occurs for the other valve when the polarity of lines 35 and 37 is reversed. Since the ignition current is derived directly from the source, the potential drop across the ignition electrodes 49 follows the source potential and, therefore, rises to the value necessary for conduction at an angle in each half cycle of the source which depends on the magnitude of the potential required for ignition and which we have designated as the ignition angle. The angle may be adjusted to any desired value by properly selecting the ignition electrode 49 or by properly setting the source potential for any given ignition electrode. For example, if an ignition electrode requiring approximately 100 volts to render the valve conductive is selected, the ignition angle occurs at the point in the half-cycles of the source for which the instantaneous magnitude is 200 volts. As has been shown above, for a 440-volt source, this angle is of the order of 18.7°, and for a 220-volt source, it is of the order of 40°.

When the starting switch 67 is closed, the starting relay 59 is repeatedly energized and deenergized with a periodicity depending on the relationship between the conducting and the insulating segments 81 and 83, respectively, of the outer commutator ring 71 and on the speed of the motor 55. The contactor 85 of the relay, therefore, is closed intermittently for an interval of time corresponding to the angular length of the conducting segment 81 and the speed of the motor. During these intervals, impulses of welding current, each several half-periods of the source in length, flow through the load 31. Each impulse is made up of sub-impulses, each of which in turn flows during a half period of the source and is in the half-cycle predetermined by the selection of the ignition electrodes 49 of the valves 41 and 43 through which the sub-impulses flow. An analysis of the possible variation in the magnitudes of the composite current pulses reveals that in spite of the random closing of the starting relay, the range of variation both as regards the current time product and as regards maxima peaks is maintained within well-defined limits.

Figure 2:
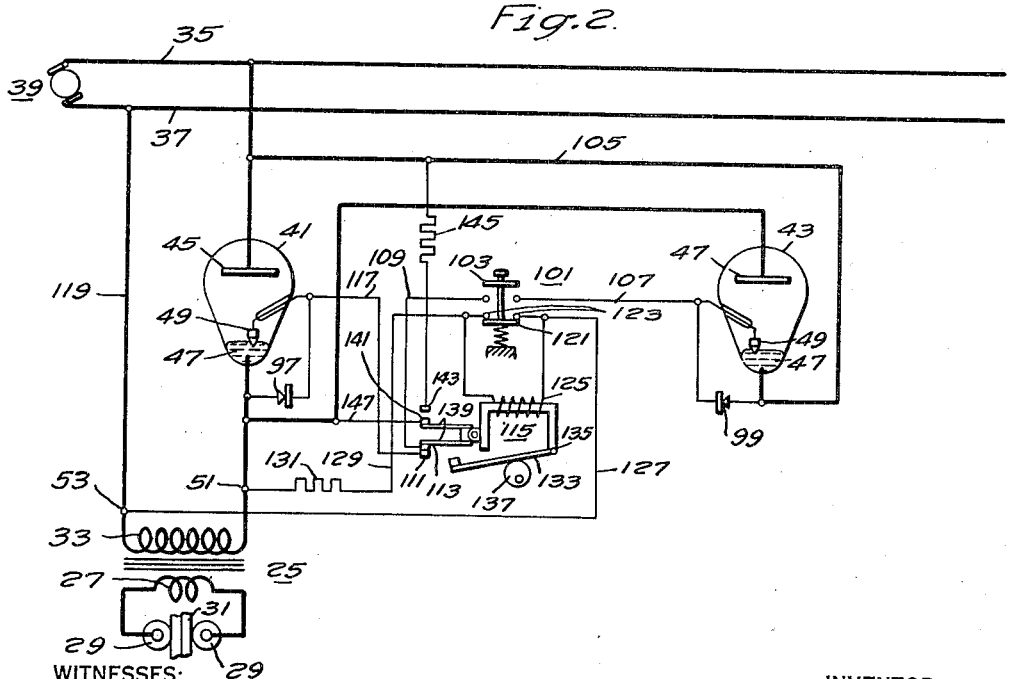
Fig. 2 is a diagrammatic view showing a spot welding system in accordance with our invention.

The apparatus shown in Fig. 2 is to a large extent similar to that shown in Fig. 1. However, rectifiers 97 and 99, preferably of the copper copper-oxide type, are in this case connected between the ignition electrodes 49 and the associated cathodes 45 of the valves 41 and 43, respectively. The rectifiers 97 and 99 are so connected that each blocks the current (assuming conventional polarity) tending to flow in the direction from the ignition electrode 49 to which it is connected to the associated cathode 47, but conducts the current flow in the opposite direction. Accordingly, substantial current flow through an ignition electrode and its associated cathode takes place only in the direction from the ignition electrode and not in the opposite direction. For example, when the upper line conductor 35 is positive and the lower one negative, the current flow is through the right-hand rectifier 99 and between the left-hand ignition electrode 49 and cathode 47. The rectifiers 97 and 99 function to protect ignition electrodes 49 which are deleteriously affected by current flow from the cathode to the electrode from deterioration. Of course the rectifiers also decrease the ignition angle for a given ignition circuit characteristic and, therefore, the ignition circuit may require modification to adapt it for use with the rectifiers.

The operation of the spot welding system shown in Fig. 2 is initiated by the actuation of a manually actuable controller 101 such as a push button or a foot switch. When the switch 101 is closed, its upper contactor 103 directly connects the ignition electrodes 49. Current then flows through one of the ignition electrodes from the line conductor which happens to be positive to the one which happens to be negative. At the time the upper line conductor 35 is positive and the lower negative, a current flow is in a circuit which extends from the upper line conductor through a conductor 105, the right-hand rectifier 99, a conductor 107, the switch contactor 103, a conductor 109, the normally closed contacts 111 and 113 of a timer relay 115, a conductor 117, the ignition electrode 49 and the cathode 47 of the left-hand valve 41, the primary 33 of the welding transformer 25, a conductor 119 to the lower line conductor 37. A potential is thus impressed from the main source 39 across the left-hand ignition electrode 49. When it attains the proper value for ignition, the left-hand valve 41 is rendered conductive and current is transmitted through the primary 33 of the transformer 25. An impulse of current of the opposite polarity is transmitted through the right-hand valve 43 and the primary of the transformer when the lower line conductor 37 is positive and the upper one negative and the proper potential is impressed across the ignition electrode.

When the manually actuable switch 101 is operated, its lower movable contactor 121 disengages a pair of corresponding fixed contacts 123 and opens a short circuit across the coil 125 of the timing relay 115. The coil 125 is now supplied with current in a circuit extending from the left-hand terminal 53 of the primary 33 of the transformer 25 through a conductor 127, the coil 125, a conductor 129, a current limiting resistor 131 to the right hand terminal 51 of the secondary. The relay 115 is provided with an armature 133 hinged at one end 135 in a position set by an adjustable cam 137. The characteristic time period of the relay 115 is the time required for the armature 133 to move from the position at which it is set by the cam 137 to a point where it engages a pair of interconnected leaf springs 139 carrying the movable contacts 113 and 141.

When the coil 125 of the relay 115 is energized, the armature 133 begins to move from its set position and after the characteristic time it engages the spring 139, causing the normally closed contacts 111 and 113 of the relay to open and the movable contactor 141 to engage a cooperative fixed contact 143. By the opening of the normally closed contacts 111 and 113, the connection between the ignition electrodes 49 is broken and the current flow through the valves 41 and 43 is interrupted after the current in the last valve that is conductive when the contacts are opened becomes zero. The normally open contacts 141 and 143 when closed complete a circuit extending from the upper line conductor 35, through the conductor 105, a resistor 145, the now-closed contacts 141 and 143, a conductor 147, the resistor 131, the conductor 129, the exciting coil 125 of the relay 115, the conductor 127, the conductor 119, to the lower line conductor 37. The relay 115 is now locked in the energized condition and the armature 133 is prevented from permitting the normally closed contacts 111 and 113 to reclose and cause the valves 41 and 43 to be reignited.

When the armature 133 opens the contacts 111 and 113, an operation producing a single spot weld is completed. The weld is several half-periods long and its length depends on the setting of the cam 137. To produce another spot weld, the manually actuable controller 101 is permitted to open and is then reclosed. When the switch 101 is opened, the coil 125 of the timing relay 115 is short-circuited by the contactor 121 and the ignition circuit is at the same time maintained open at the upper contactor 103. The apparatus is thus reset for a second operation. The closing of the switch 101 initiates a second welding operation. In the Fig. 2 arrangement, as in the Fig. 1 system, undesired deviation of the welding current flow from weld to weld is prevented by reason of the fact that the valves can only be ignited between certain angles in the half-cycles of the source.

Figure 3:
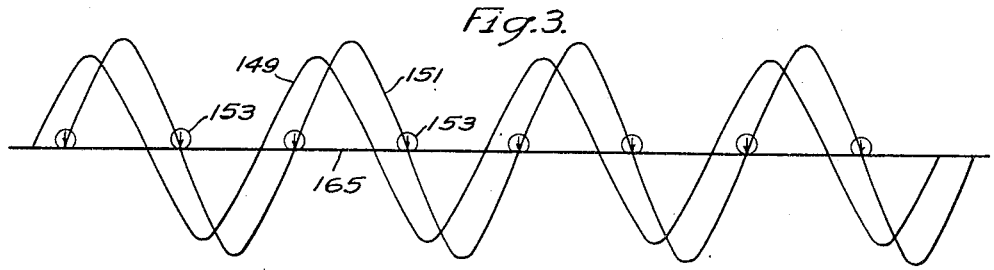
Fig. 3 is a graph showing the relationship between the potential and the current, for a load having a substantial power factor angle and supplied from an alternating source, during steady state operation.

In Figs. 3 to 19 the important aspects of our invention are illustrated graphically. In Fig. 3 the sine curve 149 of smaller amplitude represents the potential of a source such as is used in the practice of our invention as a function of time. The sine curve 151 of somewhat greater amplitude represents the steady-state current flow through a load having a lagging power factor as, for example, a welding load, as a function of time. The power factor angle in each half cycle is represented by a symbol 153 consisting of a small circle with an arrow passing through its center. The latter convention will be followed throughout.

Figure 4:
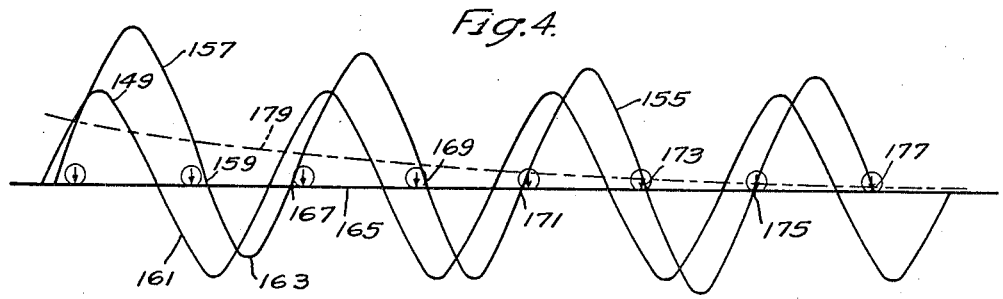

The Fig. 3 curves represent the condition of the steady-state current flow in the load. This condition exists only after the load has been supplied for a substantial interval of time. Fig. 4 shows graphically the situation which exists when the current flow in the load is first initiated. Here the curve 155 of varying amplitude represents the current flow as a function of time. In plotting curve 155 it is assumed that current flow in the load is initiated early in the first half-period of the source. It is seen from the first current half wave 157 that the current rises to a value considerably larger than the steady-state amplitude and then falls to zero at a point 159 in the next potential half-cycle 161 which occurs later than the power factor angle. The current then becomes negative and passes through a negative maximum 163 substantially smaller than the steady-state current amplitude, and after this, passes through zero and rises to a somewhat smaller positive amplitude than the first wave 157. This is repeated for a number of half-waves. Each successive positive half-wave becomes smaller while each successive negative half-wave becomes larger until the steady-state magnitude is reached on both sides of the time axes 165. As the wave amplitudes approach the steady-state magnitude, the intersection points 167, 169, 171, 173, 175 and 177 of the waves and the time axes 165 approach the power factor angle in each direction.

A wave 155 of the type plotted in Fig. 4 which precedes the point 177 at which the steady-state amplitude is reached, is designated in the art as a transient wave. It will be noted that the maximum amplitudes of the transient waves is substantially larger than the corresponding amplitudes of steady-state waves and, therefore, the current which flows during a number of transient half-periods may be substantially larger than the corresponding current which flows during a number of steady-state half-periods.

A mathematical analysis of a transient wave reveals that it is made up of the sum of the steady-state wave and a logarithmic function which becomes substantially zero when the steady-state condition is reached. The logarithmic function is represented by the dash-dot curve 179 in Fig. 4. We shall refer to it herein as the decrement curve and we shall refer to the time within which the decrement curve reaches a value such that the steady state is attained as the decrement time or simply as the decrement.

Figure 5:
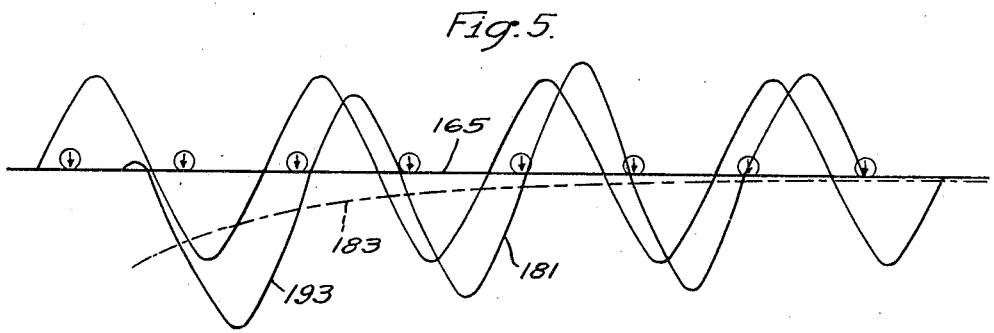
Fig. 5 is a graph showing the transient produced for the initiation of current flow late in the half-cycle.

In Fig. 5 a transient current curve 181, and a decrement curve 183 are shown for the case in which current flow is initiated late in the first half-period of the source.

Consideration of Figs. 4 and 5 reveals that the height above or below the time axis 165 from which the decrement curve 179 or 183 starts, and therefore, the decrement time is dependent on the electrical angle between the power factor point and the point of starting. This situation arises by reason of the fact that the current through the load must necessarily be zero at the point of starting and at this point the decrement curve has its maximum height. Since the transient current is equal to the sum of the steady-state current and the decrement at each point, the maximum height of curve must be equal to the ordinate which the steady-state current curve would have at starting. This ordinate is a maximum at a point leading the power factor point by 90 electrical degrees and decreases to zero at the power factor point. Accordingly, the decrement is a maximum for starting at approximately 90° from the power factor point, and becomes smaller as the power factor point is reached.

Figure 6:
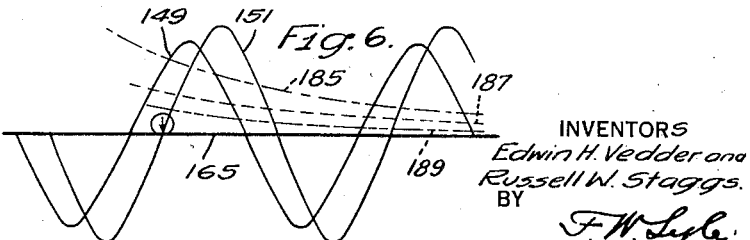
Fig. 6 is a graph showing the relationship between the transient and the angle of initiation of current flow.

This situation is illustrated graphically in Fig. 6, in which the potential of the source and the steady-state current are again plotted as a function of time. Several decrement curves 185, 187 and 189 are plotted in dot-dash lines to correspond to different angles of the initiation of current flow. The upper curve 185 represents the condition which would exist for the initiation of current flow at a point leading the power factor point by 90 electrical degrees. The lower curves 187 and 189 represent correspondingly smaller angles of deviation from the power factor point. It will be seen that as the power factor point is approached the decrement curve, and therefore, the corresponding decrement time, become relatively smaller.

The above analysis reveals that when a load having a substantial power factor angle is supplied from an alternating-current source, the current which passes during the transient interval varies over a wide range depending on the angle in the half-cycle at which current flow is initiated. In a system in which the load is continuously supplied, the steady-state condition is reached after a few half-periods and the effect of the transient is of minor importance. However, this situation does not exist in welding, and in particular, in resistance, spot and seam welding. Here current flows for a number of half-cycles and is blocked for a number of half-cycles. The total interval of time during which current flows is of substantially the same order of magnitude as the decrement time of the load and the same is true of the pause interval. Accordingly, when a welding load is supplied, the steady-state condition is rarely reached and the transient current must be taken into consideration.

From the foregoing consideration it also appears that with asynchronous timing apparatus constructed in accordance with the prior art, it is substantially impossible to obtain uniformity in the current supplied to the individual welds. Asynchronous timing equipment of this type may start one weld at a point 90° displaced from the power factor point and for it the supply of current may be relatively large. Another weld may be started substantially at the power factor point and in this case the initial current flow may be half of the current flow for the first-mentioned point. For a limited number of half-periods of the source the current time product is thus materially varied and the maximum instantaneous current occurring during one welding interval may differ widely from that occurring during another interval.

The latter effect is particularly aggravating in the welding of materials more critically responsive to varying current conditions such as aluminum. By reference to Figs. 4 and 5 it will be seen that the first transient current loop 157 or 193 is of substantially larger amplitude and persists substantially longer than the following ones. The energy supplied to the material while the current represented by the first transient loop is flowing is proportional to the integral, with respect to time, of the square of the ordinates of the loop and is, therefore, as much as several times that attending a steady-state current supply. We have found that the high energy input produced by transients such as there represented in Figs. 4 and 5 have a particularly deleterious effect on the material welded, evidenced by spitting of molten material from the regions of the weld, arcing and in extreme cases, explosion of the weld.

In the apparatus constructed in accordance with our invention shown in Figs. 1 and 2, the non-uniformity is suppressed by the device of limiting the angle in the half-cycles during which current flow is initiated by using asymmetric discharge paths which permit current flow once initiated to continue in only one direction. As has been explained, the potential which must be impressed across the ignition electrodes 49 in the apparatus shown in Figs. 1 and 2 to produce ignition is of substantial magnitude. Since this potential is supplied from the main source through the contactors 85 and 111 and 113 of the timing relays 59 and 115 the source potential must rise to the necessary magnitude before ignition takes place. Hence, if in the Fig. 1 system the brush 69 engaging the outer ring 71 of the asynchronously driven commutator 57, in producing a weld, first contacts the conducting segment 81 very early in a half-period of the source, or very late in a half-period, current flow through one or the other of the valves 41 or 43 is not at once initiated. The flow of current only starts when the source potential reaches the proper value for ignition. There is, therefore, a passive region in each half-cycle of the source 39 during which the current supply for the welding load cannot be initiated even if the starting relay 59 is energized. The same is true of the instant of closure of switch 101.

Figure 7:
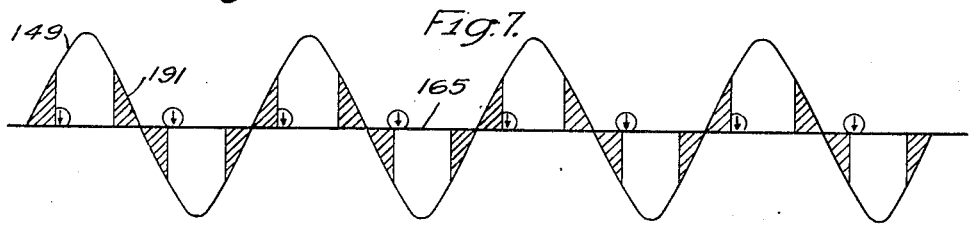
Fig. 7 is a graph showing the regions wherein the initiation of current flow is impossible in the practice of our invention.

In Fig. 7, the passive regions are illustrated by the shaded areas 191 under the curve 149 representing the source potential. For the purpose of the graph it has been assumed that the relationship between the ignition potential and the source potential is such that the source potential rises to the ignition value at an angle of 30° from the zero point, i. e., the ignition angle is 30°. Of course, by using ignition electrodes of different types or by varying the potential of the source, this angle may be shifted over a considerable range. As shown in Fig. 7, the angle of ignition is smaller than the power factor angle. In view of this fact, the flow of welding current may be at times initiated prior to the power factor angle by the energization of the starting relay 59 in the apparatus shown in Fig. 1 or the closure of the switch 101 in the Fig. 2 apparatus at an instant corresponding to a point in the shaded areas 191. However, the source potential and the ignition electrodes are so selected in the practice of our invention that the transient produced is relatively small and does not cause the welding current to exceed the permissible limit.

Figure 8:
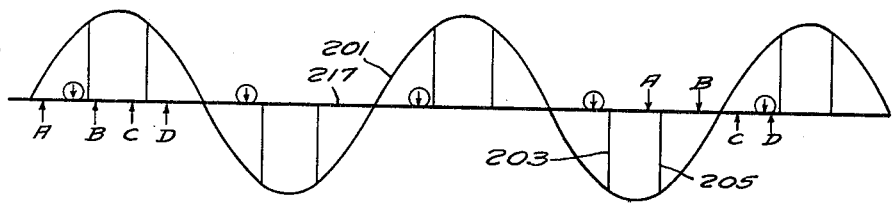
Figs. 8, 9, 10, 11 and 12 are graphs showing the extent of variation in the magnitude of a two-cycle pulse supplied with apparatus constructed as disclosed in Figs. 1 or 2.
Figure 9:
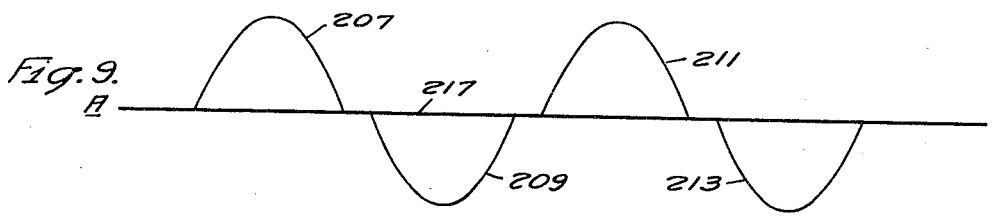

The variation in the current flow which would exist in a system in accordance with Figs. 1 or 2 in which welding current flows intermittently for two cycles is shown graphically in Figs. 8 to 13. In Fig. 8, the sine curve 201 represents the source potential. The vertical lines 203 and 205 cutting out sections at the beginning and end respectively of the half-cycles of the sine curve 201 are ordinates of the curve representing a potential equal to the ignition potential. The line 203 at the beginning of the half cycles is displaced from the zero point just prior to it by the angle of ignition; the other line is displaced from the zero point following it by an angle equal to the angle of ignition which we shall designate as the pre-zero passive angle. We shall designate the total angle in any half cycle within which ignition cannot take place as the passive angle. It will be noted that for the example which is plotted, the ignition angle is assumed to be greater than the power factor angle.

For the supply of current for two cycle intervals, the timing contactors 85 and 111 and 113 must be closed for a certain interval of time which may be less than two half periods. This arises from the fact that once a valve 41 or 43 is rendered conductive, it remains conductive as long as its anode-cathode potential is sufficient to maintain the arc. We have accordingly taken 3½ half periods as a representative time of closure for a 4 half period welding impulse in preparing the graphs shown in Figs. 8 to 13. We have further assumed the angle of ignition to be somewhat approximately 60°.

To compare the magnitudes of the current impulses for different times of closure of contactors 85 and 111 and 113, we shall determine the magnitudes of the impulses which are produced by closure at four representative points indicated by the arrows A, B, C and D on the left in Fig. 8. The arrows A, B, C, D on the right represent termination of the intervals of closure corresponding to initiation at the left-hand points A, B, C, D. It will be noted that the timing contactors are assumed to be initially closed at a point A early in the first half-cycle, at a point B just after the angle of ignition is passed, at a point C just before the source voltage becomes smaller than the ignition voltage, and at a point D within the pre-zero passive angle. The right-hand points A, B, C, D, are of course, displaced 3½ half-periods from the corresponding left-hand points. The current flow corresponding to the points of closure A, B, C, D is plotted in Figs. 9 to 12 respectively. Each plot is identified by the letter to which it corresponds.

When the time of closure is at A, current flow is initiated through one of the valves 41 or 43 at the ignition angle and since the latter is greater than the power factor angle, the flow continues to a point which occurs somewhat earlier than the power factor angle in the first half-period. The flow during the first half-period of the source 39 is represented by the upper loop 207 on the left in Fig. 9. Once the ignition circuit 49—47 is closed at the left-hand point A, it remains closed up to the right-hand point A. Accordingly, the ignition circuit is closed when the ignition voltage in the second, third and fourth half-periods of the source are reached and current flows through the valves 41 and 43 in accordance with loops 209, 211 and 213. The latter loops are the same as left-hand loop 207 and represent sub-impulses of the same magnitude. The current-time product for this case is represented by the four loops. It is to be noted in passing that actually the energy supplied for welding is obtained by integrating the square of the current over the interval during which a pulse is supplied and multiplying by a factor. On this basis, the area under loops formed by squaring the ordinates of the loops plotted in Fig. 9 would most accurately represent the welding energy supplied. However, for our present purpose consideration of the heights and number of the loops is sufficient.

Figure 10:
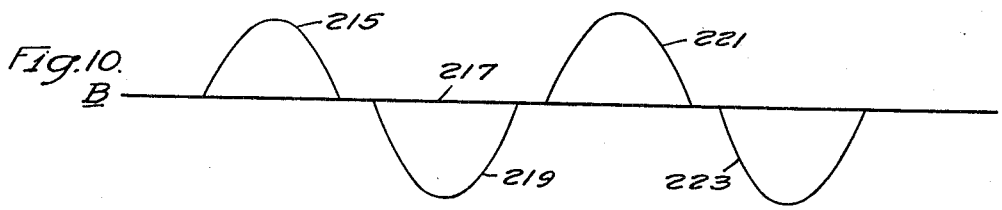
Figure 11:
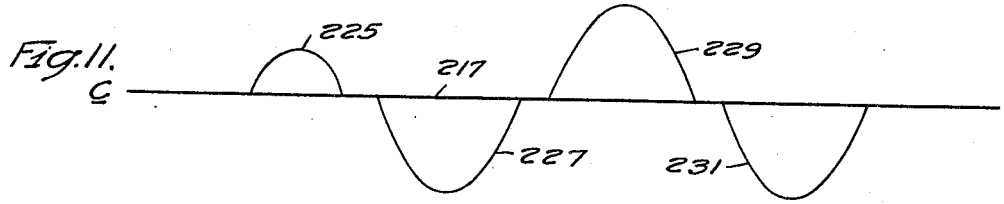

When the point of closure is at B, the current flow in the first half-period is initiated somewhat later than the occurrence of the angle of ignition. The current loop 215 in Fig. 10 corresponding to the initiation of current flow at point B is, therefore, somewhat smaller than the current loop 207 corresponding to initiation at the ignition angle and cuts the time axis 217 somewhat earlier than does the latter. Once the ignition circuit is closed at B (left hand) it remains closed until the right-hand point B is reached and, therefore, during the 2nd, 3rd and 4th half-periods current flow is initiated at the ignition angle and the corresponding lops 219, 221 and 223 in Fig. 10 represent the same magnitudes as the 2nd, 3rd and 4th loops 209, 211 and 213 in Fig. 9.

Since the ignition at point C is considerably later in the first half-period than at the points A and B, the corresponding current is substantially smaller and current flow is terminated correspondingly earlier. This situation is represented by the left-hand loop 225 in Fig. 11. The current flow during the 2nd, 3rd and 4th periods for closure at point C again commences at the ignition angle and, therefore, the loops 227, 229 and 231 for these periods are the same as the corresponding loops for closure at points A and B. The closure of the ignition circuit 49—47 is terminated at right-hand point C in the 5th half-period. However, since this point occurs earlier than the ignition angle no current flow takes place during the 5th half-period.

Figure 12:
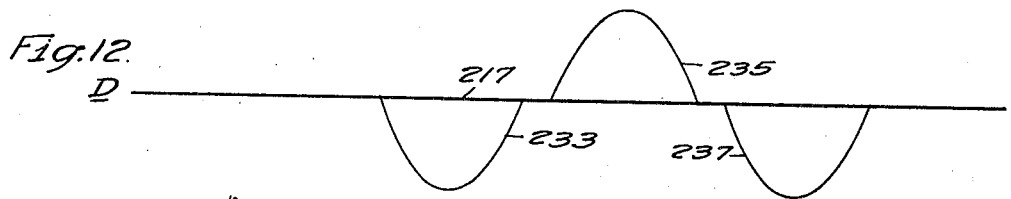

Since the ignition at point D takes place at an angle in the first half-period at which the instantaneous potential is smaller than the ignition potential, there is no current flow at all during this half-period and no corresponding loop in Fig. 12. Current flow during the 2nd, 3rd and 4th half-periods for ignition at the left-hand point D is initiated at the ignition angle and, therefore, the corresponding loops 233, 235 and 237 are the same as in the other views. Moreover, since the right-hand point D occurs just prior to the ignition angle in the 5th half-period, there is no current flow during this half-period.

Figure 13:
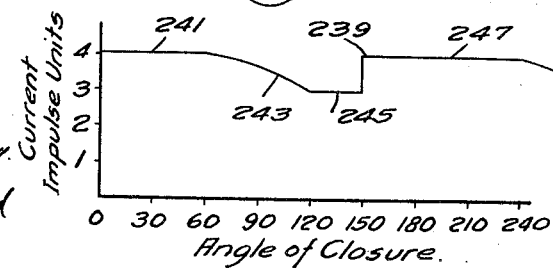
Fig. 13 is a graph showing the variation in the current as a function of the angle of closure of the ignition circuit for the apparatus on which Figs. 8 to 12, inclusive, are based.

From Figs. 8 to 12 a graph of the welding current flow as a function of the angle of closure of the contactors which we may designate as starting angle, is plotted. The curve 239 in Fig. 13 is such plot. In this view, current is plotted vertically in units corresponding to the loops in Figs. 8 to 12 and the starting angle is plotted horizontally. The energy supplied for welding purposes is measured by the magnitude of the current flow (regardless of polarity) and the time during which it flows, i. e., by the current-time product. Therefore, the number of loops or parts of loops in Figs. 9 to 12 represent the magnitude of current flow effective for welding.

As the angle of closure varies from zero to the ignition angle which is 60°, the welding current flow remains constant at 4 units as represented by the left-hand horizontal portion 241 of the curve 239. From the ignition angle to the vertical line 205 which bounds the pre-zero passive angle, the current flow decreases gradually to 3 units as represented by the sloping portion 243 of the curve. This decrease extends over an angle of 60° and at the 120° point therefore the current flow is 3 units. The latter magnitude of current remains constant as represented by the short horizontal portion 245 of the curve, until the termination of the closure period (right-hand points A, B, C, D) occurs later than the ignition angle in the 5th half-period. The length of the time of closure is 3½ half-periods or 3 half-periods plus 90°. The ignition angle is at 60° in the fifth half-period. Therefore, the time of closure will terminate just at the ignition angle in the fifth half-period if the period of closure begins at a point 3 half-periods plus 90° back from the fourth half cycle plus 60°, i. e. 30° back from the beginning of the second half-period or 150° in the first half-period. Therefore, at an angle of closure of 150° current flows not only during the second, third and fourth half-periods, but also during the fifth half-period. During the latter half-period current flow begins at the ignition angle and therefore the corresponding sub-impulse has the same magnitude as the sub-impulses represented by loops 233, 235 and 237 of Fig. 12. A fourth sub-impulse is, therefore, added to the three represented in Fig. 12 at the 150° point the current flow again rises to four units. The current flow now continues at four units as represented by the horizontal line portion 247 on the right until the ignition angle in the second half-period is reached, at which point the flow decreases in the same manner as it decreased at the 60° angle.

From a consideration of Figs. 8 to 13, it is seen that the maximum deviation of the current flow is 25% of the maximum current flow. Moreover, for closure of the contactors 85 and 111 and 113 over a considerable portion of the half-period, the current flow is substantially constant at the four unit magnitude. The minimum magnitude only occurs for point of closure over a relatively small portion of the half-period. Since the point at which the contactors are closed is purely a matter of chance, Figs. 8 to 13 show that not only is the range of variation limited by apparatus constructed and operated in accordance with our invention, but also the number of welds for which the extreme deviation occurs is decreased substantially.

The deviation may be still further decreased by a proper selection of the time of closure. The 3½ half-period time on which Figs. 8 to 13 are based was selected more or less at random. An analysis of the situation reveals that for a 60° ignition angle, the time of closure should be somewhat larger than 3½ half-periods.

As a matter of fact we have found that for the most uniform supply of current, the timing contactors should maintain the ignition circuit 49—47 closed for an interval of time that is less than the number of half-periods during which current is to flow, but greater than the number of half-periods less one plus twice the fraction of the half-period which is represented by the passive angle in any one half-period. Thus, if $n$ is the number of half-periods during which current is to flow and $r$ is the fraction of a half-period represented by the ignition angle, the time during which the timing contactors 85 and 111 and 113 should remain closed for a single welding impulse is less than $n$ half-periods but somewhat greater than $n-1=2r$ half-periods For a two-cycle weld the time of closure of the ignition circuit 49—47 should accordingly be less than four half-periods but greater than $3+2r$ half-periods. Since $r$ in the present case is ⅓, the time of closure should preferably be 3⅔ half-periods.

The lower limit $(n-1)+2r$ is selected with the purpose of eliminating the substantial gap (30°) which by reference to Figs. 13 and 14 will be seen to exist between the angle of closure, at which current does not flow in the first half-period, and the angle of closure for which current begins in the 5th half-period. Current flows in the first half-period until the angle of closure reaches the vertical line 205 bounding the pre-zero passive angle. At this point, it is desirable that current should flow in the 5th half-period. To accomplish this purpose, the time of closure should be equal to three half-periods plus the interval of time represented by the pre-zero passive angle, plus the interval of time represented by the ignition angle in the 5th half-period. Specifically this is 3 half-periods plus twice 60/180 or 3⅔ half-periods. In general, for supply of welding current during $n$ half-periods, the condition is attained by making the time of closure equal to $n-1$ half-periods plus the fraction of a half-period represented by the pre-zero passive angle plus the fraction of a half-period represented by the ignition angle. As has been mentioned above, for a sinusoidal wave this is $n-1+2r$.

It will be noted that if the time of closure is precisely $n-1+2r$ half-periods, the three unit current portion 245 of the curve 239 in 13 becomes a point in lieu of a horizontal line. Consideration of Fig. 13 further reveals that the ordinate of the point to which the dropping portion 243 of the curve falls may be raised by increasing the time of closure above the value just mentioned. The effect of this is, however, to cause current sometimes to flow both during the first-half-period and during the 5th half-period. The current during the 1st half-period, however, is in such a case, relatively small. For different situations, different times of closure will be required. However, it is seen that by making the angle of closure less than $n$ half-periods and greater than $n-1+2r$ half-periods, substantially any condition varying from relatively crude semi-synchronism to almost exact synchronism may be attained. In the arrangement shown in Fig. 1, the time of closure may be varied over the necessary range simply by varying the field resistance 63 of the motor 55. In the Fig. 2 arrangement, the time of closure is varied by rotating the cam 137 which regulates the elevation of the armature 133 to the desired position.

As regards the Fig. 1 apparatus, it is moreover to be noted that sometimes the first closure of the timing contactor 85 will take place when the brush 69 engages the external ring 71 of the commutator 57 at a point intermediate the terminals of the conducting segment 81. For engagement of this type, current flow during the first interval of engagement may, of course, continue for a number of half-periods substantially smaller than that for which the apparatus is designed. However, since the apparatus is designed to be used in seam welding, the first pulse of current is of no consequence.

While an asynchronous timer is to be preferred in the Fig. 1 apparatus because of the low cost, a synchronous timer may also be used. A timer of this type may, for example, be provided by substituting a synchronous motor for the direct current motor 55 and replacing the relay 59 and the commutator 57 by a cam rotated by the motor, the cam being arranged to close and open the ignition circuit 49—47 in the same manner as the contacts 85 and 87. In this arrangement, the synchronous motor may without the necessity of refined adjustments be set to close the ignition circuit somewhere within the passive angle and thus the repeated supply of a predetermined number of half-cycles of welding current may be assumed. Of course, a synchronous timer of the type disclosed hereinabove may also be used for spot welding if properly modified.

In the example represented in Figs. 8 to 13, the ignition angle is assumed to be larger than the power factor angle. In general, this condition may not exist in practice. However, even if the ignition angle is substantially smaller than the power factor angle, the range of variation of the welding current is satisfactorily limited with apparatus constructed according to our invention.

In Figs. 14 to 19, the current graphs for different angles of closure are plotted for a 30° ignition angle and a 45° power factor angle. Here again the upper sine curve 249 represents the source potential as a function of time. The vertical lines 251 and 253 represent the ordinates of the curve 249 corresponding to the minimum potential for which ignition takes place. The arrows E, F, G and H on the left represent points of closure of the contactor 85 and 111 and 113 and the arrows E, F, G, H, on the right represent the termination of the time of closure for the corresponding points on the left. In the present case, the time of closure is made equal to 3½ half-periods. This, it will be seen, is in accordance with the formula derived above since, for the case now illustrated, $n-1+2r=3\frac{1}{3}$ half-periods.

For closure substantially early in the first half-period as at point E, current flow through the load is initiated at the angle of ignition and continues to a point somewhat later than the power factor angle. Since this point is also later than the angle of ignition for the 2nd half-period, current flow now continues during the 2nd half-period and passes through zero at a point approaching closely the power factor angle. From there, current flow continues during the subsequent two half-periods with its zero at the power factor angle. The current during the first half-period is of larger amplitude than steady-state current; during second half-period, the amplitude is smaller than the steady-state amplitude and during the third and fourth half-periods, the amplitudes are equal to the steady-state value. The difference between the amplitudes is, however, not substantial. The four loops 255, 257, 259 and 261 in Fig. 15 represent the current flow for the point E. In Fig. 16, the current curve 263 for ignition later than the ignition angle but earlier than the power factor angle, is plotted. Here again, there is a slight transient but the deviation of the current flow from the steady-state current flow is in no sense substantial.

Fig. 17 represents graphically the condition attained when the ignition takes place just earlier than the beginning of the pre-zero passive angle. For this case, there is a small current sub-impulse loop 265 represented by the left-hand during the first half-period and it is followed by transient sub-impulses identical to those represented in Fig. 15 during the next two half-periods and two steady-state sub-impulses during the 4th and 5th half-periods. The latter four sub-impulses are represented by the four loops 267, 269, 271 and 273 following the small loop 265. It is to be noted that current flows during the 5th half-period because the termination of the time of closure as represented by the point G occurs at a point later than the ignition point in this period.

For the point H where the time of closure commences within the pre-zero passive angle, current does not flow during the first half-period but does flow during the 2nd, 3rd, 4th and 5th half-periods. The current flow during the latter half-periods is the same as the current flow during the 1st, 2nd, 3rd and 4th half-periods for the condition in which the closure takes place prior to the ignition point in the first half cycle (E), as shown in Fig. 15.

An examination of Figs. 15 to 18 reveals that the variation of current as represented by these plots, is relatively small. In Fig. 19, the current flow is plotted as a function of the starting angle. The resulting curve 275 is, in its general form, similar to the curve 239 of Fig. 13. It is to be noted that the range of deviation in this case is substantially smaller than the range corresponding to the Fig. 13 plot.

The modification shown in Fig. 20 is similar to that shown in Fig. 1 with the exception that the ignition circuit is closed through the secondary 277 of an auxiliary transformer 279. The transformer 279 is preferably so connected that its secondary potential is opposite in phase to that impressed from the source. Since the timing arrangement used in the Fig. 20 modification is the same as that used in Fig. 1, only the movable contactor 85 of the timing relay 59 is shown.

When the timing relay 59 is energized, the movable contactor 85 engages the corresponding fixed contacts 87 and closes a circuit through a section 281 of the auxiliary secondary 277 as determined by an adjustable tap 283. Under such circumstances, the net potential impressed across the ignition electrodes 49 is made up of the source potential less the potential supplied by the secondary of the auxiliary transformer 279. The valves are in their turn, ignited when this net potential attains the ignition value.

Fig. 22 illustrates graphically one cycle of the operation of the apparatus shown in Fig. 21. The full line sine curve 285 of larger amplitude represents the source potential and the curve 287 represents the potential supplied by the auxiliary transformer 279. The broken line curve 289 represents the sum of the two potentials. The vertical full lines 291 extending from the time axis 293 to points on the full line curve 285 are ordinates of this curve representing potentials of the magnitude of the ignition potential. The broken vertical lines 295 are of the same height as the full vertical lines 291 and are equal ordinates of the broken line curve 289. The lines 295, therefore, cut out the actual angle of ignition in the half-periods for the system illustrated in Fig. 20 while the lines 291 cut out the angle of ignition which would exist in the absence of the auxiliary transformer 279. It will be noted that by the interposition of the auxiliary transformer 279, the ignition angle has been considerably delayed. Without the transformer the ignition angle is smaller than the power factor angle. With the transformer, it is substantially larger. By introducing the transformer, therefore, the angle may be adjusted to a desired value.

Further adjustment, such as may be necessary to control the heat produced by the welding current, may be added by interposing between the connecting contactors from the secondary 277 of the auxiliary transformer 279 and the contacts 87 a phase shift network. By the operation of such a network the phase relationship between the curves 285 and 287 may be adjusted to any value rather than merely 180° and, therefore, the points in the half-periods at which the valves 41 and 43 are rendered conductive may be varied over a wide range.

While our invention has hereinabove been described as applicable principally to welding apparatus, it also has general applicability. In its broadest aspects, the subject matter of our inventive concept is somewhat analogous to the various devices which are used in the high vacuum tube art to vary the amplification factor. Our invention thus broadly contemplates the variation of the amplification factor of a discharge valve of the immersed ignition electrode type.

In Fig. 22 the use of our invention in regulating the output of a rectifier system is illustrated. A load 297 of any general type is energized from a suitable supply transformer 299 through a pair of discharge valves 301 and 303 of the immersed ignition electrode type. Each of the valves has an anode 305, a mercury pool cathode 307 and an ignition electrode 309. The anodes 305 of the valves are connected to the terminals of the secondary 311 of the supply transformer and the cathodes 307 are connected together. The load is connected between the intermediate tap of the secondary 311 and the common connection point of the cathodes 307 through one direct-current winding 313 of a saturable reactor 315. The ignition electrodes 309 of the valves are connected across the secondaries 317 and 319 of an auxiliary transformer 321 through their cathode 307 and corresponding alternating-current windings 323 and 325 of the reactor 315. The reactor 315 is also provided with a biasing winding 327 supplied from a direct current source 329 through a rheostat 331. The rheostat is so set that the reactor 315 is presaturated by a predetermined amount, the polarity of the saturation being such that it is counterbalanced by the saturation produced by the direct current winding 313.

As the current through the direct-current winding 313 of the reactor varies, the saturation of the reactor 315 varies and the reactance of the alternating-current windings 323 and 325 varies. The potential impressed across the ignition electrodes 309 in series with the windings 323 and 325, therefore, varies accordingly. By properly adjusting the magnitude of the biasing direct current, any desired regulation may be attained for the system. For any setting, the reactor 315 absorbs a certain portion of the potential from the auxiliary transformer 321; the remaining portion is impressed across the ignition electrodes 309. The points in the half-cycles of the main source at which the valves 301 and 303 are rendered conductive is dependent on the net potential impressed on the ignition electrodes and the ignition of the valves occurs earlier or later, depending on the direct current flowing through the reactor from the source. Accordingly, for a proper setting, an increase in the direct current flowing through the load 297, and, therefore, through the reactor winding 313, may have the effect of causing the valve 301 or 303 that passes current during the succeeding half-period to be rendered conductive later in its half-period and, therefore, a decrease may take place in the current flow through the load. A decrease in the load current correspondingly results in a decrease in the potential absorbed by the reactor and a corresponding decrease in the delay of ignition of the valve.

The operation of the Fig. 22 apparatus is illustrated in Fig. 23. The sine curve 333 of the largest amplitude represents the source potential. The sine curve 335 of intermediate amplitude represents the net potential impressed across the ignition electrodes 309 for a predetermined load current. The sine curve 337 of smallest amplitude represents the potential impressed across the ignition electrodes for larger load current. The vertical lines 339 and 341 are ordinates of the latter sine curves 335 and 337 of a height equal to the ignition potential. It will be noted that when the load current is large (curve 337) the main valves 301 and 303 are ignited substantially later in their half-periods (ordinate 341) than when the smaller current flows (curve 335 and ordinate 339). Hence the subsequent current flow through the valves is substantially smaller in the latter case than in the former.

In the above-discussed embodiments of our invention it is shown as applied in systems in which the discharge valves are supplied from alternating current or periodic sources. Our invention also has many applications in which the valves are supplied from direct current sources. For example, in testing apparatus it is often necessary to trigger off a valve in circuit breaker arrangements or when a potential to be measured first attains a predetermined magnitude. In using our invention in apparatus of this type, the potential to be measured is impressed across the ignition electrode of a valve of the immersed-ignition electrode type. The anode-cathode potential of the valve may be supplied from a direct-current source. The ignition electrode characteristic is so selected that when the measured potential attains the critical value, the valve is rendered conductive and locks itself in the conductive condition until released by a means such as is shown in Patent Number 1,783,234, issued December 2, 1930, to Floyd Firestone.

Although we have shown and described certain specific embodiments of our invention, we are fully aware that many modifications thereof are possible. Our invention, therefore, is not to be restricted except insofar as is necessitated by the prior art and by the spirit of the appended claims.

We claim as our invention:

1. In combination with a source of periodically pulsating potential and an electric discharge device of the immersed-ignition-electrode type having a plurality of principal electrodes, said device to be rendered conductive at instants in the periods of said source that are predeterminable at will and a predetermined critical potential drop being required across said ignition electrode to render said device conductive; means for impressing a potential from said source between said principal electrodes, means for impressing a potential from said source across said ignition electrode and means, including auxiliary connections, for so setting the time-rate of change of said last-named potential that the potential across said ignition electrode first reaches the critical value in each period at said instants, the connection of said impressing means and said setting means being such that the maximum rate of change of said potential impressed across said control electrode with respect to time, until just after the critical value is reached, is of the same order of magnitude as that of a potential having the same wave form as that of the source and having the same frequency and amplitude as said potential impressed across said ignition electrode.

2. For use in supplying power from a source of periodically pulsating potential to a load, the combination comprising electric discharge valve means interposed between said source and said load, said valve means having a plurality of principal electrodes and control electrode means of the immersed ignition type, a normally open circuit for impressing a potential across said control electrode means from said source, and means for closing said circuit for an interval of time, commencing at a random instant relative to the pulsations of said source and in length substantially less than the time occupied by $n$ pulsations of said source but greater than the time occupied by $(n-1)+2r$ pulsations of said source, where $n$ is the number of periods of said source during which current is to flow to said load by reason of the closure of said circuit and $r$ is the fraction of a period of said source from the point in said period where the source potential is a minimum to the point where the potential across said control electrode means supplied through said circuit is first sufficiently large to render said valve means conductive.

3. For use in supplying power intermittently from a source of periodically pulsating potential for intervals of time substantially $n$ periods of the pulsations of said source in length, the combination comprising electric discharge valve means interposed between said source and said load, said valve means having a plurality of principal electrodes and control electrode means of the immersed ignition type, and means for applying across said control electrode means, at a random instant relative to the pulsations of said source, a periodic potential, which rises during each of its periods to a value sufficient to render said valve means conducting for an interval of time substantially less than $n$ periods of the pulsations of said source, and greater than $n-1+2r$ periods of the pulsations of said source, where $r$ is the ratio, to a period of the pulsations of said source, of the time interval between the occurrence of the minimum potential of said source and the rise of said control electrode means potential to a value sufficient to render said valve means conductive during any pulsation of said source.

4. For use in supplying power intermittently from a source of periodically pulsating potential for intervals of time substantially $n$ periods of the pulsations of said source in length, the combination comprising electric discharge valve means interposed between said source and said load, said valve means having a plurality of principal electrodes and control electrode means of the immersed ignition type, and means for connecting said control electrode means in circuit with said source to supply a potential, across said control electrode means which rises during each of the periods of the pulsations of said source, to a value sufficient to render said valve means conducting for an interval of time, commencing at a random instant relative to the pulsations of said source, and in length substantially less than $n$ periods of the pulsations of said source, and greater than $n-1+2r$ periods of the pulsations of said source, where $r$ is the ratio, to a period of the pulsations of said source, of the time interval between the occurrence of the minimum potential of said source and the rise of said control electrode means potential to a value sufficient to render said valve means conductive during any pulsation of said source.

5. For use in supplying power intermittently from a source of periodically pulsating potential for intervals of time substantially $n$ periods of the pulsations of said source in length, the combination comprising electric discharge valve means interposed between said source and said load, said valve means having a plurality of principal electrodes and control electrode means of the immersed ignition type, and means asynchronous with said source for connecting said control electrode means in circuit with said source to impress a potential, across said control electrode means, which rises during each of the periods of the pulsations of said source, to a value sufficient to render said valve means conducting for an interval of time substantially equal to $n-\frac{1}{2}$ periods of the pulsations of said source.

6. For use in supplying power intermittently from a source of periodically pulsating potential for intervals of time substantially $n$ periods of the pulsations of said source in length, the combination comprising electric discharge valve means interposed between said source and said load, said valve means having a plurality of principal electrodes and control electrode means, and means for applying across said control electrode means, at a random instant relative to the pulsations of said source, a periodic potential, which rises during each of its periods to a value sufficient to render said valve means conducting for an interval of time substantially less than $n$ periods of the pulsations of said source, and greater than $n-1+2r$ periods of the pulsations of said source, where $r$ is the ratio, to a period of the pulsations of said source, of the time interval between the occurrence of the minimum potential of said source and the rise of said control electrode means potential to a value sufficient to render said valve means conductive during any pulsation of said source.

7. For use in supplying power intermittently from a source of periodically pulsating potential for intervals of time substantially $n$ periods of the pulsations of said source in length, the combination comprising electric discharge valve means interposed between said source and said load, said valve means having a plurality of principal electrodes and control electrode means of the immersed ignition type, and means for connecting said control electrode means directly in parallel with said principal electrodes at a random instant in the pulsations of said source to supply a potential, across said control electrode means which rises during each of the periods of the pulsations of said source, to a value sufficient to render said valve means conducting for an interval of time substantially less than $n$ periods of the pulsations of said source, and greater than $n-1+2r$ periods of the pulsations of said source, where $r$ is the ratio, to a period of the pulsations of said source, of the time interval between the occurrence of the minimum potential of said source and the rise of said control electrode means potential to a value sufficient to render said valve means conductive during any pulsation of said source.

8. For use in supplying power intermittently from a source of alternating current to a load for intervals of time substantially $n$ half-periods of said source in length, the combination comprising in effect a pair of electric discharge paths connected between said source and said load to transmit alternating current to said load, each of said paths having a cathode and a control electrode of the immersed ignition type immersed therein and low impedance means for directly interconnecting said control electrodes for an interval of time that commences at random relative to the pulsations of said source and in length is substantially smaller than $n$ half-periods of said source but larger than $n-1+2r$ half-periods, where $r$ is the fraction of a half-period of said source from the point of zero potential in any half-cycle to the point in said half-cycle where one of said paths is rendered conductive.

9. For use in supplying current intermittently from a source of periodically pulsating current to a load having a substantial power factor angle for an interval of time of the same order as the decrement of the current flow through said load if initiated early in a pulsation of said source, the combination comprising electric discharge valve means interposed between said load and said source, said valve means having a plurality of principal electrodes and a control electrode means of the immersed ignition type, said control electrode means requiring a potential of substantial magnitude to render said valve means conductive, and means for applying to said control electrode means, for a span of time of the same order as said interval, a potential that first rises to said substantial magnitude at an angle, in the pulsations of said source, occurring during said interval of time, that is of the same order of magnitude as said power factor angle.

10. For use in supplying current intermittently from a source of periodically pulsating current to a load having a substantial power factor angle for an interval of time of the same order as the decrement of the current flow through said load if initiated early in a pulsation of said source, the combination comprising electric discharge valve means interposed between said load and said source, said valve means having a plurality of principal electrodes and a control electrode means of the immersed ignition type, said control electrode means requiring a potential of substantial magnitude to render said valve means conductive, and means for applying to said control electrode means for a span of time of the same order as said interval a potential that first rises to said substantial magnitude at an angle in the pulsations of said source occurring during said interval of time that is of such magnitude relative to the power factor angle that the transient in the current flow through said load disappears in a time of the order of one or two periods of the pulsations of said source.

11. For use in supplying current intermittently from a source of periodically pulsating current to a load having a substantial power factor angle for an interval of time of the same order as the decrement of the current flow through said load if initiated early in a pulsation of said source, the combination comprising electric discharge valve means interposed between said load and said source, said valve means having a plurality of principal electrodes and a control electrode means of the immersed ignition type, said control electrode means requiring a potential of substantial magnitude to render said valve means conductive, and means for connecting said control electrode means in series with said source and load, said connecting means including potential absorbing means by the operations of which the potential impressed on said control electrode means rises to said substantial magnitude at an angle in the pulsations of said source occurring during said interval of time that is of the same order of magnitude as said power factor angle.

12. For use in suplying current intermittently from a source of periodically pulsating current to a load having a substantial power factor angle for an interval of time of the same order as the decrement of the current flow through said load if initiated early in a pulsation of said source, the combination comprising electric discharge valve means interposed between said load and said source, said valve means having a plurality of principal electrodes and a control electrode means of the immersed ignition type, said control electrode means requiring a potential equal in magnitude to the instantaneous magnitude of said source potential at an angle in the pulsations which is of the same order of magnitude as the power factor angle to render said valve means conductive, and means for directly connecting said control electrode means in series with said source and load for a span of time of the same order as said interval.

13. For use in supplying current intermittently from a source of alternating current to a load having a substantial power factor angle for an interval of time of the same order as the decrement of the current flow through said load if initiated early in the pulsations of said source, the combination comprising means for connecting one terminal of said load to one terminal of said source, a first electric discharge path of the immersed ignition electrode type having in effect an anode, a cathode and a control electrode immersed in said cathode, means for connecting said anode to the other terminal of said source, means for connecting said cathode to the other terminal of said load, a second electric discharge path of the immersed ignition electrode type having in effect an anode, a cathode, and a control electrode immersed in said cathode, means for connecting the last said anode to said other terminal of said load and said last-named cathode to said other terminal of said source, and means for directly connecting said control electrodes for a span of time of the same order of magnitude as said interval, the drop in potential across said control electrodes required for rendering one of said paths conductive being equal to the instantaneous magnitude of said source of potential at an angle in the cycle of said source that is of the same order of magnitude as said power factor angle.

14. Apparatus for supplying current from an alternating current source to a load of the type that is deleteriously affected by the sudden application of a sub-impulse of current, such as a transient, that is substantially larger than the current necessary for the load, comprising electric discharge valve means having a passive angle and having control electrode means and principal electrode means interposed between said source and said load, and means for directly connecting all of the electrode means of said valve means to both terminals of said source in such manner that said control electrode means and said principal electrode means are simultaneously supplied with potential from said source before said valve means is rendered conductive, the electrical properties of said valve means and said connecting means being so related to the magnitude of the potential of said source that the apparatus has a passive angle of such magnitude that transients of deleterious magnitude are suppressed.

15. Apparatus for supplying current from an alternating current source to a load of the type that is deleteriously affected by the sudden application of a sub-impulse of current, such as a transient, that is substantially larger than the current necessary for the load, comprising electric discharge valve means of the immersed-ignition-electrode type having a passive angle and having ignition electrode means and principal electrode means interposed between said source and said load and circuit means including current rectifying means for directly connecting all of the electrode means of said valve means to both terminals of said source in such manner that said ignition electrode means and said principal electrode means are simultaneously supplied with potential from said source before said valve means is rendered conductive, the electrical properties of said valve means and said connecting means being so related to the magnitude of the potential of said source that the apparatus has a passive angle of such magnitude that transients of deleterious magnitude are suppressed.

16. Apparatus for supplying current from an alternating current source to a load of the type that is deleteriously affected by the sudden application of a sub-impulse of current, such as a transient, that is substantially larger than the current necessary for the load, comprising electric discharge valve means having a passive angle and having control electrode means and principal electrode means interposed between said source and said load and means for directly connecting all of the electrode means of said valve means to both terminals of said source in such manner that said control electrode means and said principal electrode means are simultaneously supplied with potential from said source before said valve means is rendered conductive, said valve means being the only electric discharge means incorporated in the apparatus for control purposes, the electrical properties of said valve means and said connecting means being so related to the magnitude of the potential of said source that the apparatus has a passive angle of such magnitude that transients of deleterious magnitude are suppressed.

EDWIN H. VEDDER.
RUSSELL W. STAGGS.